UNITED STATES PATENT OFFICE.

JOHN VON DER KAMMER, OF CHICAGO, ILLINOIS.

ILLUMINATOR FOR ELECTRIC LAMPS.

SPECIFICATION forming part of Letters Patent No. 457,830, dated August 18, 1891.

Application filed January 10, 1891. Serial No. 377,331. (No specimens.)

*To all whom it may concern:*

Be it known that I, JOHN VON DER KAMMER, a subject of the Emperor of Germany, residing at Chicago, county of Cook, State of Illinois, have invented a new and useful Improvement in Illuminators for Electric Lamps, of which the following is a full, clear, and exact specification.

My invention relates to incandescent lamps, and particularly to the process of manufacturing illuminators therefor.

The object of my invention is to provide a cheap illuminator which will secure a high degree of brilliancy in the light and will produce a long-lived well-shaped illuminator.

Heretofore filaments have been used in incandescent lamps, said filaments being made of masses of material cut or otherwise shaped to such sizes as may be desired. These filaments have been heretofore preferably made of carbon. Instead of this process I produce an illuminator in the following manner: I take a quantity of cellular material like cotton, linen, silk, &c., in thread-like form and thoroughly cleanse and purify the same from dye, grease, and the like by means of a boiled solution of oxalic acid and water in such suitable proportions as may be required in any given case. The threads are preferably wound upon glass frames, so as to give the greatest exposure, and are then immersed in this solution for such time as may be required to cleanse them thoroughly. This immersion or exposure to this solution or to some other similar solution is then continued until such time as a slight destruction of the fiber of the threads has taken place. This prevents the twisting of the thread in the subsequent processes. I now prepare a solution consisting of a quantity of the compound known as "shoe-blacking" and suitable quantities of water from time to time added thereto, the whole being preferably ground between smooth plates until a very thin liquid paste has been obtained. The threads are now submerged in this paste for a suitable length of time, and they are then dried, so as to complete the process of filling or replacing the cellular structure, so as to produce an illuminator of great evenness of resistance when the same is subjected to the current in the lamp. The thread is now suitably heated, so as to assume the condition under which it will serve for an illuminator.

I claim—

1. The process of manufacturing illuminators for incandescent electric lamps, which consists in the following steps: first, taking a quantity of cellular threads and cleansing the same; second, subjecting the same to a slightly-destructive action of acid or the like; third, immersing the same in a thin paste of ground shoe-blacking mixed with water; fourth, drying and heating the same.

2. An illuminator for incandescent electric lamps, consisting of a thread-like cellular body having incorporated therewith suitable quantities of a thin paste composed of shoe-blacking mixed with water.

JOHN VON DER KAMMER.

Witnesses:
CELESTE P. CHAPMAN,
HARRIET M. DAY.